C. W. CANINE.
MARKING MACHINE FOR LAUNDRIES.
APPLICATION FILED MAR. 12, 1903. RENEWED OCT. 4, 1912.

1,059,657.

Patented Apr. 22, 1913.
6 SHEETS—SHEET 2.

C. W. CANINE.
MARKING MACHINE FOR LAUNDRIES.
APPLICATION FILED MAR. 12, 1903. RENEWED OCT. 4, 1912.

1,059,657.
Patented Apr. 22, 1913.
6 SHEETS—SHEET 4.

Fig. 4

Witnesses:
Inventor: Chester W. Canine,
By Thomas G. Orwig, Attorney

UNITED STATES PATENT OFFICE.

CHESTER W. CANINE, OF DES MOINES, IOWA, ASSIGNOR OF ONE-HALF TO LEONARD S. SMITH AND ETHAN B. STANLEY, OF CINCINNATI, OHIO.

MARKING-MACHINE FOR LAUNDRIES.

1,059,657. Specification of Letters Patent. Patented Apr. 22, 1913.

Application filed March 12, 1903, Serial No. 147,540. Renewed October 4, 1912. Serial No. 723,952.

*To all whom it may concern:*

Be it known that I, CHESTER W. CANINE, a citizen of the United States, residing at Des Moines, in the county of Polk and State of Iowa, have invented a new and useful Marking-Machine for Laundries, of which the following is a specification.

This invention relates to a machine especially designed for use in laundries for the purpose of placing a permanent mark upon each piece of goods. In this connection, it is of importance to remember that the laundry packages from one person frequently contain a large number of pieces varying greatly in both size and texture; say for instance from a ladies' lace handkerchief to a woolen blanket. Obviously it would be impractical to print a mark of the same size upon each article, for the mark on the lace handkerchief must be quite small and inconspicuous or else it would be highly objectionable as disfiguring the handkerchief, while the mark upon a coarse fabric, such as a woolen blanket must be many times larger, or else it could not be read nor easily found. It is also important to bear in mind that all of the pieces contained in a laundry package, or belonging to one particular person, must be marked with the same symbol or symbols. Hence, it is of the greatest importance that a machine be provided that may be set in position where any number of marks may be printed from the same type keys without possibility of variation or mistake.

The objects of my invention are to provide a machine of simple, durable and inexpensive construction, having a set of letter bearing keys and a number of sets of numeral bearing keys, so that the symbol to be printed upon the laundry pieces may contain first, a letter of the alphabet corresponding to the first letter of the owner's name, and then a combination of numerals for the purpose of distinguishing each owner's name beginning with the same letter, and to provide a symbol susceptible of a very large number of variations, and further in this connection to provide a symbol which may consist simply of a letter of the alphabet or which may consist of a letter of the alphabet and any one of a number of numerals ranging from 0 to 9, or a letter of the alphabet and two or more sets of numerals each ranging from 0 to 9.

A further object is to provide a number of sets of type bearing plates, each set being identical with the other except for size, each set of said type bearing plates, being of materially different size and all of them actuated simultaneously by a single set of type keys, to thereby provide type of different sizes adapted for marking articles of different size and texture.

A further object is to provide a device of simple, durable and inexpensive construction by which the operator may, by touching a single key, return all of the type bearing plates in the various sets to their starting point or neutral position.

A further object is to provide independent printing plates for each set of type bearing plates, any one of which platens may be operated independently either by foot or by hand as required to force the article to be printed into operative contact with the type bearing plates, and further in this connection to provide automatically operating inking devices designed to apply fresh ink to the type plates on the particular set of type to be used, said inking devices operated by power from the hand or foot lever of the particular printing platen being used, to the end that only the particular set of type being used may be inked immediately before the article to be printed is placed in contact with the type, thus avoiding the possibility of ink drying or evaporating before being used, and to prevent waste and deterioration of the ink.

A further object is to provide a printing platen of simple, durable and inexpensive construction in which the part of the platen designed to contact with each type bearing plate is arranged so as to be independently yielding relative to the other plates, so that if the surface of the fabric being printed upon is irregular, or if the symbol is being printed over a seam in the article, each type of the symbol to be printed will firmly engage the fabric as required to make a clear and distinct mark.

My invention consists in certain details in the construction, arrangement and combination of the various parts of the device, whereby the objects contemplated are attained, as hereinafter more fully set forth, pointed out in my claims and illustrated in the accompanying drawings, in which—

Referring to the accompanying drawings, I have used the reference numeral 10 to indicate the base of the machine. Mounted upon this base are three tubular uprights 11, said uprights supporting at their top a casing 12 in which the operative mechanism is contained. Inside of the casing I have arranged a number of vertical partitions 13 to form supports for the various mechanism. Slidingly mounted in the top of the casing 12 and on the left side of the casing is a series of type keys 14, each of said keys bearing one of the letters of the alphabet. Each of these keys is connected at its lower end with a key bar 15. This bar is pivoted at its rear end to a cross rod 16 supported in the partitions 13, and the bar 15 is extended horizontally toward the front of the machine. The front edge of this bar is provided with an inclined shoulder 17 for purposes hereinafter made clear. Connected with the forward end of each type bar 15 is a rod 18 extended downwardly through an opening in the guide plate 19, which guide plate is supported upon the partitions 13 in a horizontal position near the front of the machine frame. Obviously when any one of the type keys 14 is depressed its rod 18 will be forced downwardly through the guide plate 19.

I have provided means whereby each of the key bars will be locked at its downward limit of movement, automatically, as follows: The numeral 20 indicates a locking bar mounted in slots formed in the partitions 13 so that the bar 20 is capable of movement to and from the adjacent ends of the key bars 15. The said bar 20 is of a length sufficient to engage each of the key bars 15, and it is normally held against each of the key bars by means of the extensile springs 21. The locking bar 20 is so arranged that when a key is depressed the inclined shoulder 17 will force the locking bar forwardly and permit the key bar to pass beneath the locking bar, whereupon the locking bar will move to position over the inclined shoulder 17, and thereby firmly hold the key bar at its lower limit of movement. When the locking bar 20 is released the key bars are each elevated by means of a spring 22 provided for that purpose.

From the foregoing description it is obvious that when any one of the keys 14 is depressed, the rod 18 connected therewith will be forced downwardly through the guide plate 19 and locked in this position, and it is to be understood in this connection that only one key out of the entire set 14 is used at one time.

I shall next describe the means by which the particlar type corresponding to the key depressed is placed in its position for printing. The reference numeral 23 indicates a shaft rotatably supported in the adjacent partitions 13. Keyed to this shaft 23 is a locking cylinder 24 of a length to extend under all of the rods 18 belonging to the set of keys 14, and formed in this locking cylinder is a series of notches 25 so arranged as to be engaged by the rods 18. These notches are so disposed upon the periphery of the cylinder that the cylinder must be turned to a different position for each of the rods 18; that is to say the notches extend spirally around the cylinder, and in order to have the first notch engage the first rod 18, the cylinder need only be rotated a short distance, and for each successive notch the cylinder must be rotated a greater distance before the notch engages the rod 18 corresponding therewith. The object of this is made apparent when the construction and operation of the type bearing plate is understood. This type bearing plate is indicated by the reference numeral 26 and is firmly fixed to the shaft 23. The plate is in the form of a half circle, and fixed to the plate is a number of type 27, each type being held to the periphery of the plate by means of a screw 28, as clearly shown in Fig. 5 of the drawings. In this connection it is to be understood that the type are moved to a printing position which is at the front of the machine, and when the type key bearing the letter A is depressed it is only necessary to rotate the cylinder 24 a slight distance because the type 27 bearing the letter A is a very short distance beneath the opening in the casing through which the printing is done. Hence, in order to bring the letter A, which is the first one on the plate 26, to printing position, it is only necessary to move the cylinder 24 and with it the plate 26 a slight distance, and for this reason the rod 18 of the type key bearing the letter A is arranged to engage the notch 25, which when in its position of rest is arranged nearest to the outer end of the cylinder 24. Another instance, if the letter H is to be placed in printing position, the operator depresses the key bearing the letter H and this forces the rod 18 down into position where the cylinder 24 will be rotated a considerable distance before it will reach the notch 25 corresponding to the letter H and the type plate will therefore move a considerable distance before it will be stopped by the notch on the stop cylinder engaging the rod 18, and when it is stopped the type H will be in its printing position.

From the foregoing description it is obvious that the act of depressing the type keys does not move the type bearing plate but simply places in position the proper one of the bars 18 for limiting or stopping the movement of the type bearing plate. I have provided for operating the type bearing plate as follows: Fixed to the shaft 23 is a pulley 29 upon which a chain 30 is fixed and partially wound. Near the rear end of the machine is a rotatable shaft 31 and to this shaft I have fixed a drum 32 upon which the chain 30 is fixed and partially wound. In the chain 30 is a contractile coil spring 33 to permit the chain to lengthen and shorten to a limited extent. I have provided for rotating the drum 32 as follows: The reference numeral 34 indicates an arm pivoted to the disk 32$^a$ on shaft 31 at one end, and pivotally and slidingly connected with a bell crank lever 35 at its other end. This bell crank lever is operated automatically when the printing platen is moved as will hereinafter appear. Hence, when the printing platen is moved the first time the chain 30 will be drawn in such manner as to rotate the locking cylinder 24 to position where the notches thereof will engage the corresponding rod 18, and the locking cylinder will be held in this position by the spring 33. In this connection I have provided means whereby the drum 32 is locked in the position required for holding the locking cylinder 24 in position as follows: Fixed to the shaft 31 is a ratchet wheel 36, and pivoted to the adjacent partition 13 is a spring actuated pawl 37 to engage the ratchet wheel 36.

The numeral 38 indicates a releasing key connected at its lower end with a lever 39, the lower end of which is designed to engage the locking bar 20 and to force it away from the key bars 15 when the releasing lever is depressing.

The numeral 40 indicates a rod pivoted to the lever and attached to the pawl 37. Obviously, a depression of the releasing key 38 will operate to force the locking bar 20 out of engagement with the key bar 15 so that it may be elevated and at the same time it will force the spring actuated pawl 37 to position where it will disengage from its ratchet wheel 36, thus permitting the ratchet wheel 36 and the drum 32 to return to their starting position by means of the pressure of the spring 33. In this connection, I have provided means whereby the return movement of the type bearing plate will be cushioned by attaching a piston rod 41 to the drum, said piston rod entering a cylinder 42 pivoted at 43 to the machine frame, thus forming an air cushion of ordinary construction. From the foregoing description it is obvious that a pull upon the arm 34 will rotate the drum 32 and ratchet wheel 36 as required to turn the locking cylinder to position where it will engage the one of the rods 18, which is at its downward limit. This will place the type bearing plate in position with the proper type in printing position and the pawl 37 will then lock the drum 32 to position where the chain 30 and its spring 33 will hold the locking cylinder stationary until such time as the releasing key 38 is depressed, whereupon the pawl 37 is released from the ratchet wheel 36 and the drum 32 is then returned by the spring 33 to its normal position. In this connection, I have provided means for returning the locking cylinder to starting position as soon as the tension is removed from the chain 30 and spring 33 as follows: Fixed to the plate 19 is a convolute spring 44 wound upon the shaft 23 and also fixed to the shaft and exerting its resiliency in a direction tending to return the shaft 23 to its starting position. The resiliency of this spring is such that it may be overcome, and the locking cylinder rotated, when the drum 32 is turned by the arm 34, and the only function of this spring is to return the locking cylinder after the drum 32 is released. It is obvious that sometimes the cylinder 23 is turned more than at others, hence the necessity for a spring 33 in the chain 30 which will permit the chain 30 to adjust itself as to length, to correspond with this changed movement.

Thus far I have described only the mechanism for operating the type bearing plates having the letters of the alphabet marked thereon. I shall next describe the means by which the several type bearing plates having numerals marked thereon are operated.

The keys 14 occupy the space at the upper left side of the machine. Immediately to the right of the keys 14 are two rows of keys running from the front to the rear indicated by the reference numeral 45. These keys are similar to the keys 14; are provided with rods 18, which rods extend upwardly through a guide plate 46 having openings therein similar to the guide plate 19. This guide plate is arranged immediately above a locking cylinder 47 having notches 48 therein and fixed to the shaft 49 immediately in the rear of the shaft 23. Fixed to the shaft 49 is a small pulley 50 having a chain 51 attached thereto and fixed to and wound upon the drum 32. Fixed to the ends and the central portion of this shaft 49 are the type bearing plates 51ª. All of these parts correspond exactly in structure and function with the mating parts before described, except that the cylinder 47 is shorter because there are only ten type keys to be operated in connection with it, and the type bearing plates 51ª are smaller because there are only ten type plates fixed thereto. Immediately in the front of the type bars for the type keys 45 is a spring actuated locking bar 52, similar to the locking bar 20 before described. All of the parts just described operate in the same way as their mating parts in the mechanism hereinbefore specifically described. Hence, a detailed description thereof would be simply a repetition.

Figure 1:
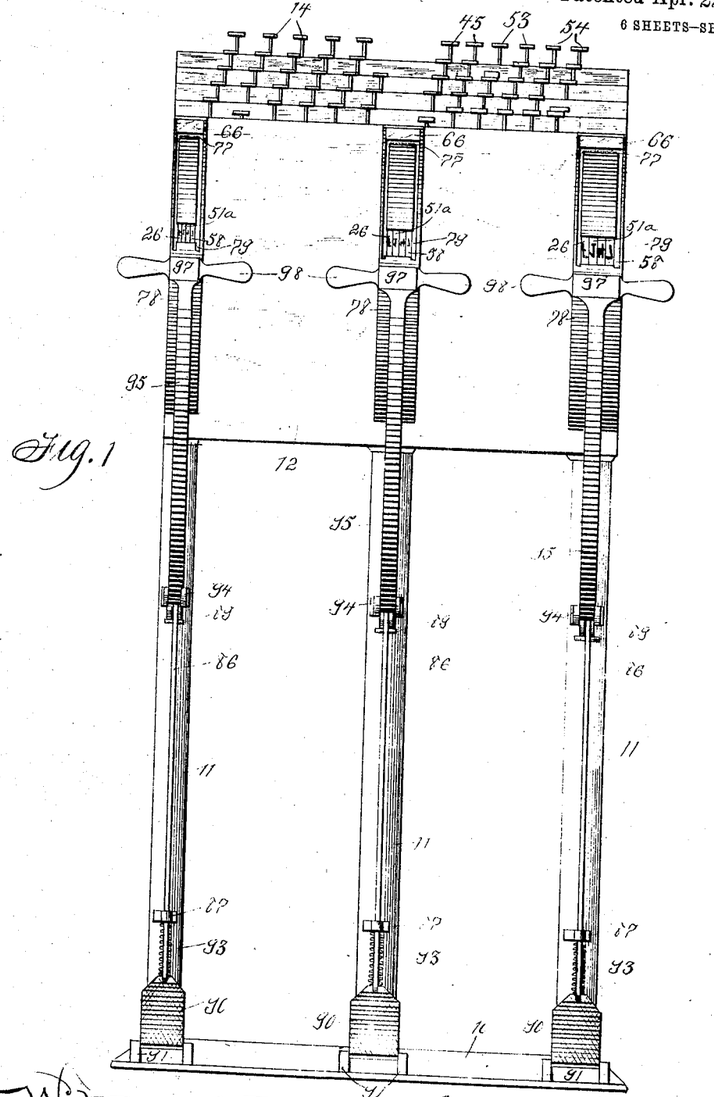
Figure 1 shows a front elevation of the complete machine.
Figures 2, 5, 6, 7:
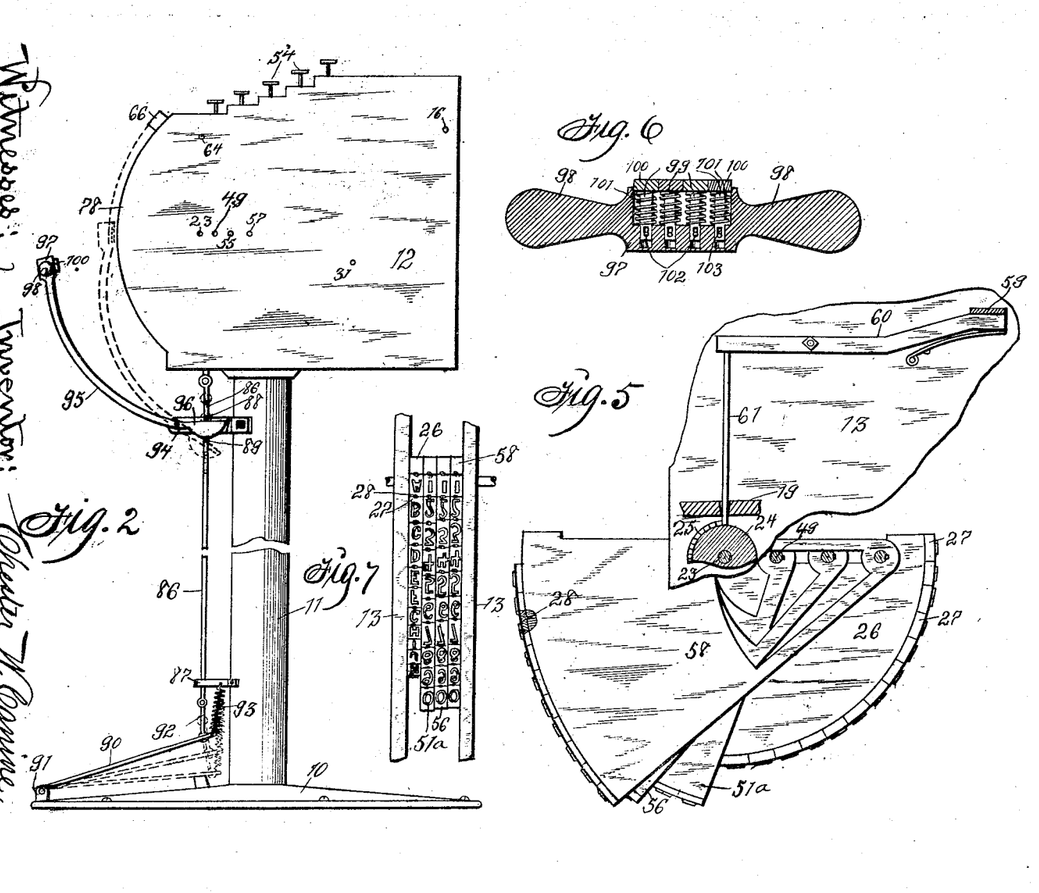
Fig. 2 shows a side elevation of the complete machine and by dotted lines indicating the position of one of the printing platens elevated, also showing by dotted lines the path of travel of one of the inking arms, and also by dotted lines showing the position of the foot treadle at its lower limit of movement and also at a point between its upper and lower limits of movement.
Fig. 5 shows an enlarged detail view illustrating one of the sets of type bearing plates and connected parts.
Fig. 6 shows a detail, sectional view of one of the printing platens.
Fig. 7 shows a front elevation of one of the sets of type bearing plates.

Immediately to the right of the keys 45 is another set of ten keys indicated by the numeral 53; and immediately to the right of the set 53 is a third set of numeral bearing keys 54. Each one of the sets of keys 53 and 54 is provided with the same mechanisms as the keys before described. The keys are arranged to work in conjunction with the shaft 55 to operate the type bearing plates 56, and the keys 54 are arranged in conjunction with the shaft 57 to operate the plates 58. From the foregoing description it is obvious that there are four shafts and each shaft carries three type bearing plates, and the plates of each set must be close together and must have their printing surfaces flush with each other when raised to printing position. This I accomplish by shaping the plates as shown in Fig. 5, and providing openings in the plates on all but the front shaft, through which the shafts may project without interfering with the movement of the plates. Obviously the plates on the different shafts must be of different radii, and the radius of each plate is such that a point on its periphery in line with the four shafts will be flush with a similar point on the other plates, and it is at this point that the printing is done.

I have provided a number of sets of type, for instance, all of those that contain the letters of the alphabet may be considered as one set, and I have also provided a single set of keys; all of those that contain the letters of the alphabet may be considered as one set, and I have also provided means whereby all of the sets of type may be controlled by the single set of keys such, for instance, as the controlling of all the sets of type that contain letters by means of a single set of keys that also contain letters.

In some instances it may be desirable to operate only the type bearing plates 26 having the letters of the alphabet thereon, and in other instances it may be desirable to operate the type bearing plates 26 in conjunction with the type bearing plates 51ª only, or other combinations may be used. When this is done I have provided means whereby the type bearing plates corresponding to the keys that are not depressed will be firmly locked in position so that they can not be moved when the platen printing mechanism is operated as follows: Directly beneath each set of key bars is a cross piece 59 mounted on arms 60, said arms being supported on the partitions 13 by being pivoted near their forward ends. When any one of the key bars 15 corresponding to any of the type bearing plates is depressed, then the bar 59 is moved downwardly. Attached to the forward end of one of the arms 60 is a locking rod 61 designed to enter an opening 62 in the locking cylinder. A spring 63 is arranged to normally hold the rear end of the arm 60 upwardly so that the locking rod 61 is normally in the openings 62 of the locking cylinder and is only removed from said opening as required to permit the locking cylinder to rotate, when some one of the key bars 15 is depressed and held downwardly. In this connection it is to be remembered that a pressure is applied tending to rotate all of the shafts upon which the type bearing plates are mounted at the same time, and obviously unless some means were provided for locking each of the type bearing plates independently of the others, they would all be rotated each time the printing platen was operated, but by means of the device just described only those type bearing plates are moved that correspond with the set of keys that has been depressed. Hence, it is possible to use the type bearing plates having the letters of the alphabet thereon without using the others, or it is possible to use any combination of the type bearing plates desired.

Figure 8:
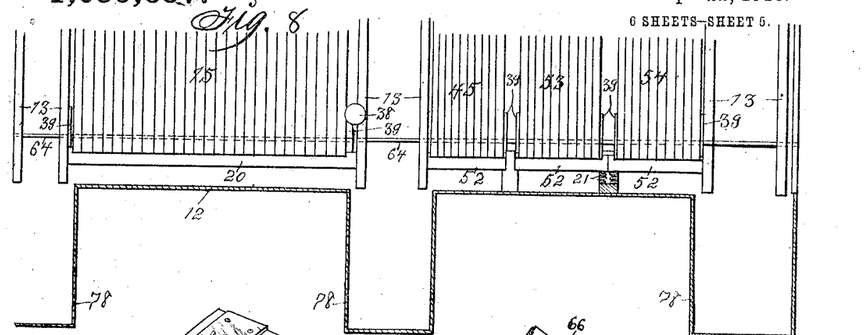
Fig. 8 shows a top or plan view of the key bars and the key bar locking bars to illustrate the manner in which the key bars are independently locked and collectively released.

Another feature which is common to all of the sets of keys is the means for releasing all of the key bars simultaneously when it is desired to set up a new combination of the type bearing plates. This mechanism comprises a rotatable shaft 64 extended completely across the machine and forming the support for the lever 39, hereinbefore described, and fixed to this shaft 64 are two levers similar to 39 and indicated in Fig. 8 of the drawings by the reference numeral 39 for each one of the locking bars 20 or 52 so that when the key 38 is depressed, all of the locking bars will be moved outwardly, thus permitting all of the key bars 15 to elevate, and, as before explained, the rod 40 will release the pawl 37 and permit all of the type bearing plates to return to starting position.

Figure 3:
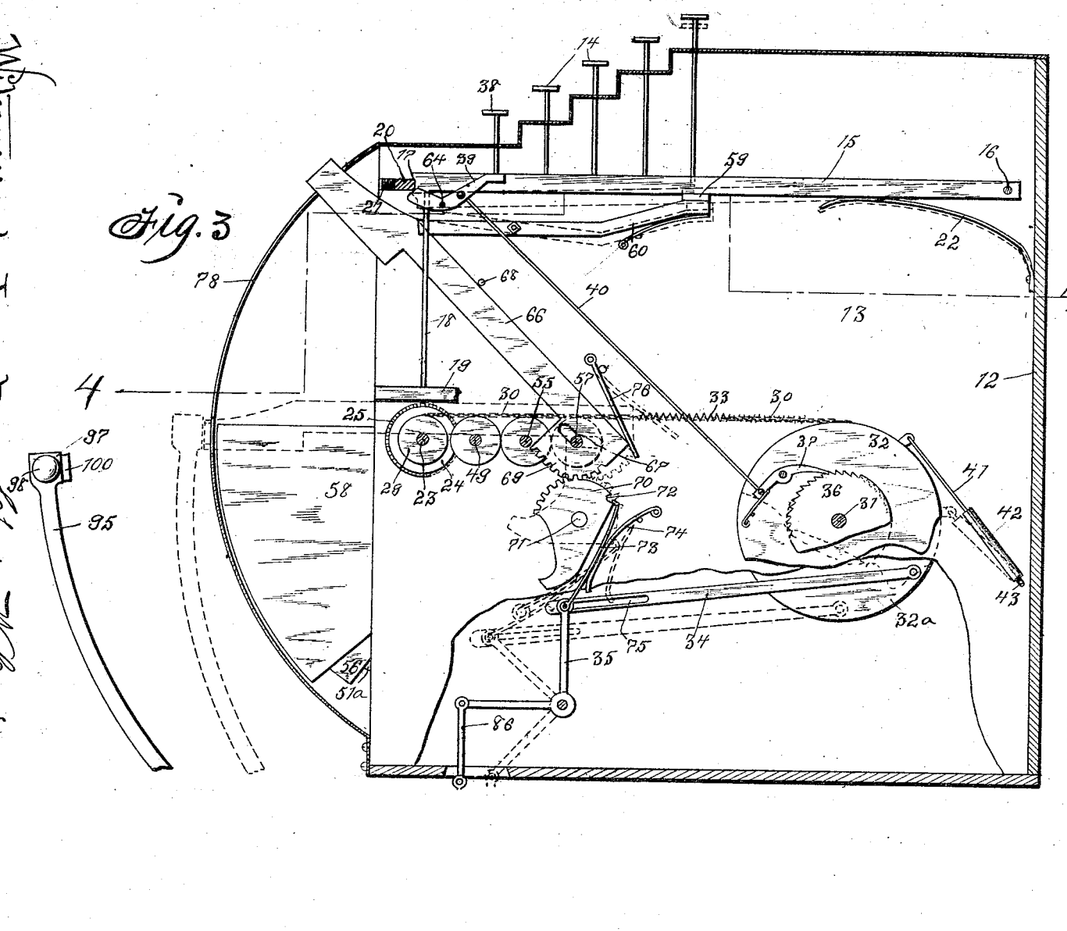
Fig. 3 shows a vertical, transverse, sectional view through the indicated line 3—3 of Fig. 4.
Figure 4:
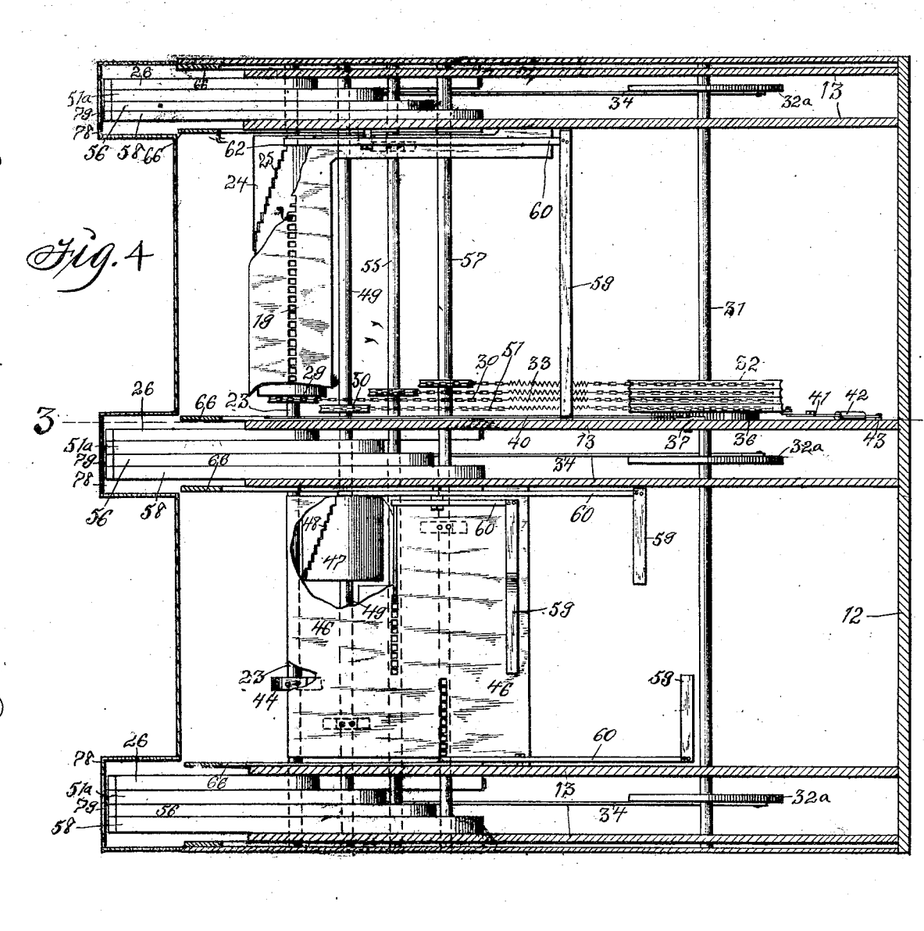
Fig. 4 shows a horizontal sectional view on the indicated line 4—4 of Fig. 3.

I have thus far described only the means for placing the type bearing plates in position and for returning them after the printing is completed. I shall now describe first the means whereby ink is applied to the type to be printed from. This means comprises an arm 66 having a slot 67 in its lower end, said slot receiving the shaft 57 upon which it is loosely mounted. There is one of these arms 66 for each set of type bearing plates. The upward movement of the arm 66 is limited by a pin 68, and, formed on the lower end of the arm 66 is a segmental rack 69 meshed with a toothed segment 70, pivoted to a support 71. This toothed segment is provided with a notch 72, and, mounted on the bell crank lever 35 is an arm 73 having a hook on its upper end to enter the notch 72. The arm 73 is held in position toward the toothed segment 70 by means of the spring 74, and, formed in the arm 34 is a slot 75 in which the upper end of the bell crank lever 35 may freely slide. The first effect of a movement of the bell crank lever is to move the arm 34 forwardly in the machine in a direction toward the position indicated by dotted lines in Fig. 3 of the drawings, this movement sets the type bearing plates in their proper position for use. During this movement, the bell crank lever moves the toothed segment 70 as required to lower the forward and upper end of the lever 66. When the hooked arm 73 has moved in this direction to the position indicated by dotted lines in Fig. 3, then the hooked arm 73 is moved out of the notch 72, thus releasing the hooked arm 73 from the toothed segment 70 and permitting the arm 66 to return to its elevated position. This is done by means of a spring 76. The function of the slot 75 is to permit the upper end of the arm 35 carrying the hooked arm 73 to move freely in the slot when the toothed segment 70 is returned to its starting position, as indicated by solid lines in Fig. 3 because this movement must be done while the arm 34 and the bell crank lever 35 are moving forwardly. The function of the slot 67 in the arm 66 is to permit the arm 66 to move as follows: When the arm starts to move downwardly the shaft 57 will be at the lower end of the slot 67, and then when the arm 66 reaches its downward limit of movement the only way it can move will be toward the rear of the machine, and then the arm moves on the shaft, the movement being permitted by said slot.

Figures 9, 10, 11, 12:
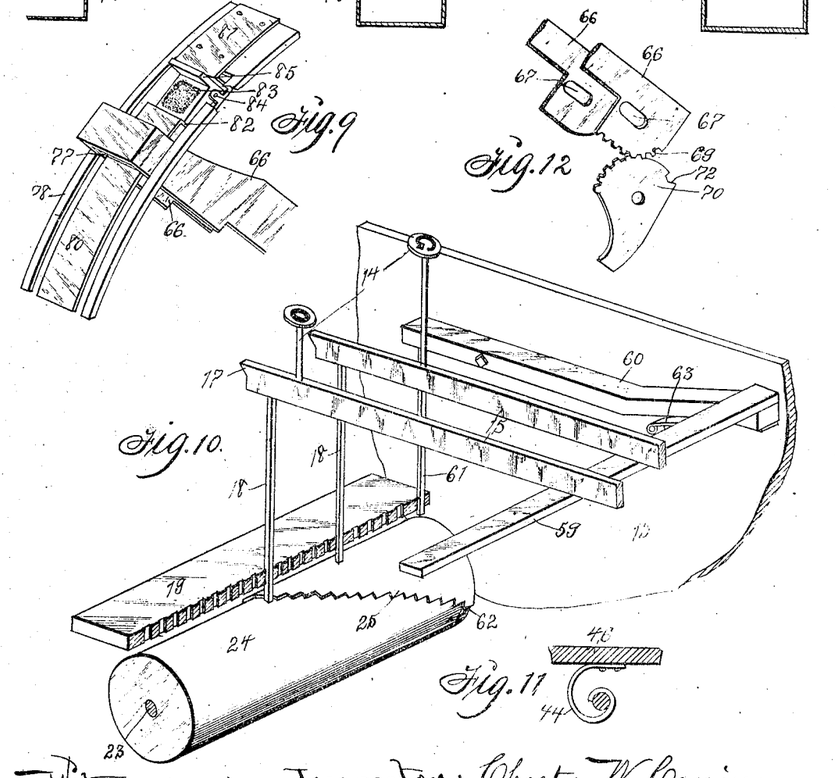
Fig. 9 shows an enlarged, detail perspective view of one of the inking devices.
Fig. 10 shows an enlarged, detail, perspective view illustrating the type plate stopping cylinder and associated parts, illustrating the means by which the depression of a key will stop the type plate at the proper position, and also illustrating the means by which all of the type plates will be released upon the pressure of a releasing key.
Fig. 11 is an enlarged, detail view illustrating the means by which the shafts of the stopping cylinders are returned to a normal position when released.
Fig. 12 shows a detail, perspective view of a part of one of the inking devices.
Figure 13:
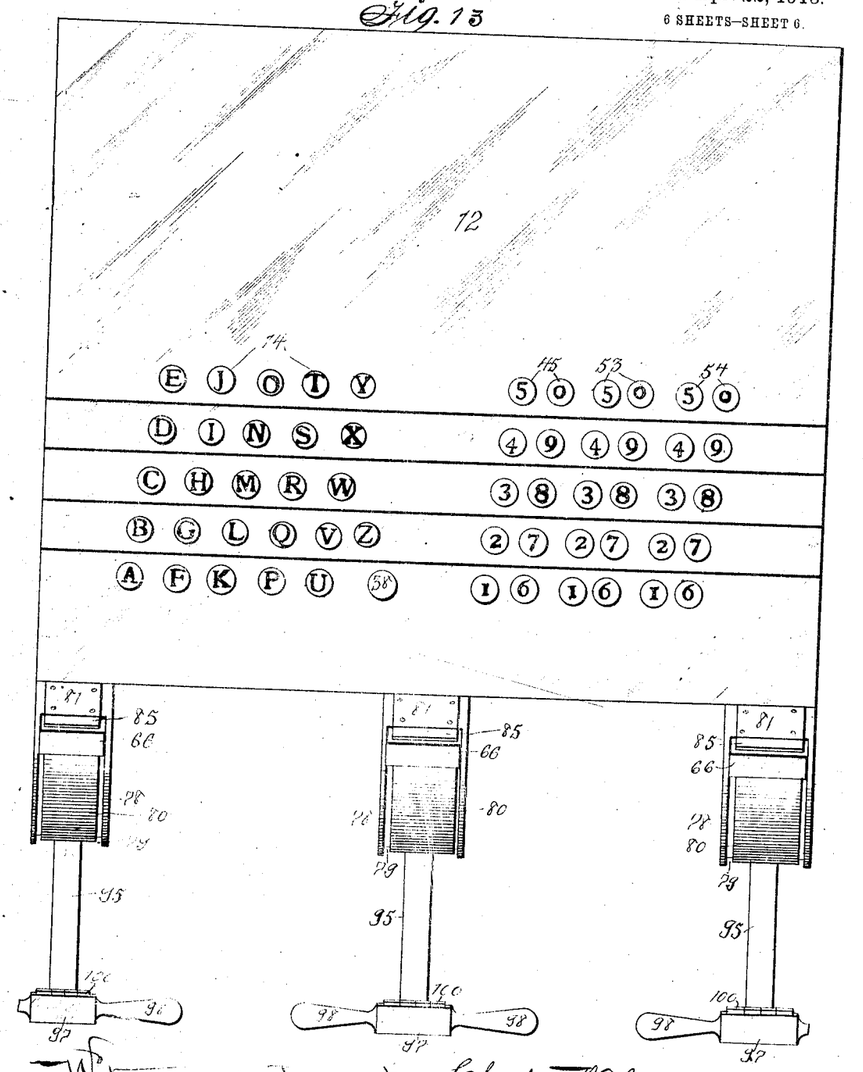
Fig. 13 shows a top or plan view of the complete machine.

From the foregoing description it is obvious that the first effect of a movement of the bell crank lever 35 is to operate the arm 34 in such manner as to set the type bearing plates to the desired position. Then the arm 66 is lowered to a point opposite the type to be used for printing as will hereinafter appear. Then it is moved rearwardly as required to ink the type, and then it is released and permitted to return to its upper limit of movement. All of these functions are accomplished before the bell crank lever 35 has moved far enough to permit the printing platen to engage the type. In the upper and outer end of the arm 66 is an absorbent pad 77 which carries the printing ink to be applied to the types. On the front of the machine casing is a segmental sheet metal shield 78 for each set of type bearing plates, and each of these shields is provided with an opening at 79 through which the type to be used may be seen from the front of the machine. This opening 78 extends upwardly in the shield as far as the arm 66 may move, and the said arm 66 projects through this opening. The arm 66 has two sides and I have provided a curved plate 80, the upper end of which is fixed at 81 to the front of the shield. A depression 82 is formed therein at the top of the opening 79, and then the body portion of the part 80 stands flush with the outer face of the shield 78 and extends downwardly to a point near the bottom of the opening 79, the sides of the arm 66 moving in the spaces between the part 80 and the shield 78 as may be clearly seen in Fig. 9. The reference numeral 83 indicates an inking pad consisting of a plate pivoted at 84 and provided with an upwardly projecting stop 85. This inking pad is placed in the depression in the plate 80 and it is so arranged that when the arm 66 moves upwardly it will strike upright part 85, thus forcing the pad 83 against the inking pad 77 carried by the arm 66, and as soon as the arm 66 starts to move downwardly the body portion of the pad 83 will be dropped by gravity and permit the arm 66 to freely move downwardly. In this connection, it should be explained that a separate and independent inking device is provided for each set of type bearing plates, and the inking pads 83 are each covered and protected by the outer ends of the arms 66, and the parts 77 are normally held in yielding contact with the pads 83 so that dust can not accumulate and so that the ink will not evaporate or harden, and the pads are only separated for the short time that the arms 66 are moving downwardly to engage the type and returning.

The printing mechanism comprises a rod 86, the upper end of which is pivoted to the lower end of bell crank lever 35. This rod is slidingly mounted in the bracket 87 at its lower end and is provided with two pins 88 and 89 near its upper end. The numeral 90 indicates a foot treadle pivoted at its outer end to the bracket 91 and at its inner to a link 92, which link is pivoted to the rod 86. A contractile coil spring 93 is provided for drawing the rear end of the foot treadle 90 upwardly, said spring being attached to the bracket 87.

The numeral 94 indicates a bracket attached to the top of the upright 11 and fulcrumed in this bracket, is a platen bearing arm 95 having on its lower end a cam 96 arranged between the pins 88 and 89 on the rod 86, so that the lower end of the arm 95 must move upwardly and downwardly with the rod 86. This is true whether the rod is pushed downwardly by the foot treadle or whether the upper end of the arm 95 is pushed rearwardly by the operator's hands. When the rod 86 is pulled downwardly in the manner just described it will operate the bell-crank lever 35, and this lever will move all of the type bearing plates to printing position, as hereinbefore described. On the upper end of the arm 95 is a body portion 97 having at its sides the handles 98 and on the inner face of the body portion 97 is a recess in which four bars 99 are slidingly mounted. On the outer face of each bar is a platen section 100 and each bar 99 is provided with an extensile coil spring 101, normally forcing the platen section to its outer limit of movement, the movement of the platen sections being limited by the pins 102 fixed to the body portion and passed through the slots 103 in the bars 99. These platen sections are of such width that one of them will exactly cover the width of the type bearing plate against which it is designed to press, and each platen section is of such length that it will cover the type against which it is to be forced. In this connection it is to be understood that a printing mechanism exactly as above described is provided for each set of type bearing plates, the only difference being that the size of the platen sections varies to correspond with the size of the type against which it is to be forced. It is also to be remembered in this connection that the movement of the foot treadle 90 or the arm 95 is designed to accomplish two purposes. First, movement of either is designed to operate the bell crank lever 35 and then a further movement will bring the platen into printing contact with the type, and by thus forming the platen in independent sections it is obvious that if a fabric of unequal thickness is placed between the platen and the type each letter on the type bearing plates will be printed distinctly because the platen will force each part of it against the corresponding type. The increased thickness of any part of the fabric only serves to depress the adjacent platen section more than the others.

In practical operation and assuming that it is desired to place the same symbol upon a large number of articles of different size and texture, the operator first depresses one of the keys 14 bearing the letter of the alphabet which corresponds to the first letter of the name of the person to whom the articles are to be delivered. Assuming that it is likely that a large number of different symbols must be used for the same initial letter, then it is necessary to depress one of the keys in each of the series of numeral bearing keys 45, 53 and 54. Each key that is thus depressed consisting of one in each series is then held downwardly by the locking bars 20. Then the operator places the article to be marked on the desired platen. He then moves the foot treadle 90 or the arm 95 corresponding to the said platen, then the drum 32 is operated, thereby moving every one of the shafts 23, 49, 55 and 57 and thus bring the type on each type bearing plate corresponding to the key depressed to position directly behind the lower end of the opening 79 in the casing 78. When these type bearing plates have thus been moved to position they are firmly locked therein by the pawl 37. If the article is small and a large mark thereon would be objectionable, he places the article against the surface of the printing platen adjacent to the smaller one of the type bearing plates. Then when the platen is moved forward toward the type the arm bearing the printing pad is moved downwardly to a point in front of the type that are exposed, then it moves rearwardly forcing the pad against the type and then it moves upwardly, all of this movement taking place while the platen bearing arm is moving toward the type. Then when the platen bearing arm strikes the type a symbol is printed upon the fabric and when the platen is returned the fabric may be removed and a new one placed in position. Assuming further that a coarse heavy fabric is to receive the same mark, the operator simply places it against the larger one of the platens and forces said platen toward the type. This operation is continued so long as it is intended to use the same mark, it being understood that during all of this time the type bearing plates are fixed in their position.

When all of the articles that are to receive the particular mark first set up are printed upon, then the operator touches the key 38. This has the effect of releasing pawl 37 and of forcing all of the locking bars 20 forwardly, thus permitting all of the type bars 45 to resume their normal position, and also permitting all of the locking cylinders to move to their normal position. Then when it is desired to set up a new combination, the type keys are depressed as before, one type key in each series, and the machine is ready for use for printing a different symbol. In some cases it may be desirable to use simply a letter and one numeral or a letter and two numerals, or one or more numerals without the letter, and I have provided means whereby every one of the type bearing plates is locked against movement unless it is released by first pressing one of the type keys in the series. This means consists of the part 59, the arm 60 and the locking rod 61.

By use of my improved machine I avoid possibility of error to a very great extent by providing means by which the type bearing plates after once having been set to position are firmly locked so that any number of marks may be printed from them without ever disturbing or moving the type bearing plates until after all of the marks have been made that it is desired to make from the same combination of type, and I avoid possibility of error further by first printing the mark upon a ticket bearing the name of the person to whom the articles are to be delivered. I have this ticket printed and then mark each of the articles belonging to that person with the same mark. Hence, even if the operator should make a mistake in touching the type keys and touch ones other than he intended to do, nevertheless, the same mark will be found on the ticket, thus positively identifying the articles as belonging to the person whose name appears on the ticket and avoiding all possibility of having one symbol on the ticket and another symbol on any one of the articles belonging to such person. Obviously, this great accuracy could not possibly be attained by the use of a machine in which type keys would have to be depressed in order to print upon each article used, for if in such case any mistake or error was made in depressing any one of the type keys throughout the entire series of articles to be marked, then some of the articles might possibly bear different marks from the others.

Another great advantage to be derived from the use of my machine is that the same combination of type is placed in position for use in a number of sets of different sizes, the operator exercising a choice as to which one of these sets of type will be used in marking each particular article, and by having only one set of keys so arranged as to set up a number of different sizes of type all bearing the same character, it is obvious that articles of different sizes and texture may be marked by the same machine and without the possibility of variation in any of the characters of said mark or symbol.

By providing a machine of this class having one set of letter bearing keys combined with a number of sets of numeral bearing keys arranged and combined as shown and described, it is obvious that a mark may be provided by which the operator may quickly and easily determine the initial letter of the name of the person to whom the goods are to be delivered, and at the same time a very large number of different symbols or marks may be printed, each mark comprising the letter of the alphabet corresponding to the name of the person to whom the articles are to be delivered. In this connection further, it is to be noted that the kind of ink that must of necessity be used on a device of this class is an ink that will not fade or deteriorate when subjected to the process used when cleaning the articles, and ink of this character usually evaporates and hardens very rapidly. Hence, by providing an inking pad that is normally held in contact with a second inking pad and is only moved from such contact an instant before the act of printing is done and returned to the printing pad immediately, it is obvious that the ink applied to the type will be fresh and not have time to evaporate from the type before the printing is accomplished. Furthermore, by having the inking pads normally in engagement with each other, all dust is excluded and the evaporation or hardening of the ink will be prevented.

In effecting a printing operation, in the manner in which my device is ordinarily used, the operator first grasps an article to be printed upon or marked in one hand and then moves this hand and the article to one of the handles on the operating lever. He then preferably grasps the same article and the other handle in his other hand. This holds the article firmly in position between the handle and resting against what I have termed the stock holding device. Obviously by this arrangement articles of vastly different sizes and shapes may be quickly, conveniently and accurately handled, and the mark may be placed at the exact point desired by the operator. In the present embodiment of my invention the platen which must be present is carried directly on the stock holding device between the handles.

An operation of printing is effected when the article to be printed on is held against the stock holder and handle, and the lever is moved toward the type, because the platen which is carried by the stock holder bears against one side of the article and forces it firmly against the type, so that a movement of the lever toward the type effects a printing operation.

Having thus described my invention, what I claim and desire to secure by Letters Patent of the United States, therefor is—

1. In a machine of the class described, the combination of a number of groups of like type, each group comprising a set of type and also a second set of type to the right of the first, the first set in each group bearing similar type, and the second set in each group bearing similar type, so arranged that an impression taken from either group will contain the same symbols, arranged in the same manner, and two sets of keys, the first one controlling all of the first set of type in both groups and a second set of keys controlling all of the type to the right of the first set in each group.

2. In a machine of the class described, the combination of a set of keys, a number of sets of type, all controlled by said keys, a second set of keys, a second number of sets of type all controlled by said second set of keys, said sets of type arranged in groups, each group comprising a set of type controlled by the first set of keys, and a second set of type arranged to the right of the first and adjacent thereto and controlled by the second set of keys.

3. In a machine of the class described, the combination of two shafts, a number of like type bearing plates on each shaft spaced apart, a set of keys controlling each shaft, a third shaft, a number of like type bearing plates thereon, the plates of the two shafts arranged in groups and a third set of keys controlling the movements of the third shaft.

4. In a machine of the class described, the combination of two parallel shafts, arranged side by side, a number of type bearing plates fixed to the first shaft, a corresponding number of type bearing plates fixed to the second shaft, said plates on the second shafts being arranged in groups, each group comprising a type bearing plate fixed to each shaft, the printing faces of two plates of each group being flush at one point and an independent set of keys for controlling the movements of each shaft.

5. In a machine of the class described, the combination of two parallel shafts, arranged side by side, a number of type bearing plates fixed to the first shaft, a corresponding number of type bearing plates fixed to the second shaft, said plates on the said shafts being arranged in groups, each group comprising a type bearing plate fixed to each shaft, the printing faces of two plates of each group being flush at one point and an independent set of keys for controlling the movements of each shaft, a locking cylinder on each shaft, and rods connected with each set of keys for engaging the locking cylinder.

6. In a machine of the class described, the combination of two parallel shafts, arranged side by side, a number of segmental type bearing plates fixed to one shaft, a corresponding number of segmental type bearing plates fixed to the other shaft, said latter plates being slotted to receive the first mentioned shaft, and also being of greater diameter than the type bearing plates on the first shaft, the type bearing plates on the said shafts being arranged in groups, each group comprising one type bearing plate carried by each shaft, the type bearing plates of each group being flush with each other at a point in line with both shafts, and an independent set of keys for controlling each shaft.

7. In a machine of the class described, the combination of a number of parallel shafts, arranged side by side, a number of type bearing plates fixed to each shaft, said plates being arranged in groups, each group comprising one plate of each shaft, the printing faces of the plates of each group being flush with each other at one point, a locking cylinder fixed to each shaft and a set of type, keys for each locking cylinder, a rod controlled by each key, coacting with the locking cylinder to limit the movement of the shaft.

8. In a machine of the class described, the combination of a number of parallel shafts, arranged side by side, a number of type bearing plates fixed to each shaft, said plates being arranged in groups, each group comprising one plate of each shaft, the printing faces of the plates of each group being flush with each other at one point, a locking cylinder fixed to each shaft and a set of type, keys for each locking cylinder, a rod controlled by each key, coacting with the locking cylinder to limit the movement of the shaft, a yielding pressure device for holding each shaft at one limit of its movement and manually operated means for turning the shaft to position where the locking cylinder will be engaged by the rods of the type keys.

9. In a machine of the class described, the combination of a number of parallel shafts, arranged side by side, a number of type bearing plates fixed to each shaft, said plates being arranged in groups, each group comprising one plate of each shaft, the printing faces of the plates of each group being flush with each other at one point, a locking cylinder fixed to each shaft, a set of type keys for each shaft, a rod controlled by each type key to engage the locking cylinder, and means for automatically locking each rod in position to engage the locking cylinder when the corresponding type key is depressed.

10. In a machine of the class described, the combination of a set of keys, a rod connected with each key, means for locking the keys at their downward limit of movement, a rocking shaft, a number of segmental type bearing plates, all bearing the same symbols fixed to the shaft, a single locking cylinder fixed to said shaft, the movements of the locking cylinder being controlled by the said rods.

11. In a machine of the class described, the combination of a set of keys, a rod connected with each key, means for locking the keys at their downward limit of movement, a rocking shaft, a number of segmental plates, type thereon of different sizes, all bearing the same symbols and fixed to said shaft, a single locking cylinder fixed to said shaft controlled by said rods, manually operated means for moving the locking cylinder in a direction required for bringing the type plates to printing position and spring actuated means for returning them.

12. In a machine of the class described, the combination of a set of keys, a rocking shaft, a locking cylinder fixed to the shaft, controlled by the said keys, a number of segmental type bearing plates fixed to the said shaft, manually operated means for moving the locking cylinder in a direction tending to bring the type plates to printing position, and spring actuated means for returning the shaft.

13. In a machine of the class described, the combination of a number of sets of keys, a rod connected with each key, means for automatically locking said rods at their downward limit of movement, a rocking shaft for each set of keys, a number of segmental type bearing plates, all bearing the same symbols, fixed to each of said shafts, and a notched locking cylinder fixed to each shaft, controlled by said rods.

14. In a machine of the class described, the combination of a shaft, a number of type bearing plates fixed to said shaft, a locking cylinder fixed to said shaft, a set of type keys coacting with the locking cylinder to limit the rotation of the shaft, means for normally holding the locking cylinder against rotation, said means released by a downward movement of any of the type keys.

15. In a machine of the class described, the combination of a shaft, a number of type bearing plates fixed to said shaft, a locking cylinder fixed to said shaft, a set of type keys coacting with the locking cylinder to limit the rotation of the shaft, means for normally holding the locking cylinder against rotation, said means released by a downward movement of any of the type keys, manually operated means for moving the shaft in a direction for bringing the type plates to printing position, and spring actuated means for returning it.

16. In a device of the class described, the combination of a set of keys, a key bar for each key, means for automatically locking each key bar when depressed, a rod connected with each key bar, a spring raised cross bar beneath the key bars, depressed when any of the key bars are moved downwardly, a rod connected with said cross piece, elevated by a downward movement of the cross piece, a shaft, a type bearing plate fixed to the shaft, a locking cylinder fixed to the same shaft, the movements of the locking cylinder being controlled by the rods of the key bars, and the rod connected with the cross piece holding the cylinder against rotation when lowered and releasing it when elevated.

17. In a device of the class described, the combination of a number of sets of keys, a rod connected with each key, means for locking the keys when at their downward limit of movement, a spring raised cross bar beneath each set of keys, depressed by a downward movement of any of the keys in the set, a rod connected with each of said cross pieces and elevated by a downward movement of the cross piece, a shaft for each set of keys, a type bearing plate fixed to each shaft, a locking cylinder fixed to each shaft, the movements thereof being controlled by the rods of the keys, the rods connected with the cross bars, holding the cylinders against rotation when lowered, and releasing them when elevated.

18. In a machine of the class described, the combination with a number of type, means for supporting them in printing position, a platen moving to and from the type, a pivoted arm 66 having a slot 67 and having a toothed segment at one end, an inking pad on the other end of the arm, a segmental rack in mesh with the toothed segment, and means controlled by the platen for actuating said toothed segment, said means moving the arm downwardly to position with its inking pad in front of the type and then toward the type, and means for automatically releasing the toothed segment, and means for elevating the arm, for the purposes stated.

19. In a machine of the class described, the combination of a number of type fixed in printing position, a platen bearing arm movable to and from the type, a head on the platen bearing arm, having handles at its sides, and a number of platen sections, corresponding in size to the type, their working faces normally flush with each other, a slotted bar connected with each platen section, a pin passed through each slot to limit the movement of the section, and a spring for each platen section, for the purposes stated.

20. In a machine of the class described, the combination of a head, a number of independent platen sections, a slotted bar connected with each section, pins connected with the head and passed through the slotted bars to limit the movement of the sections, and a spring for each section.

21. In a machine of the class described, the combination of a number of independent sets of type, a single set of keys controlling all of the sets of type, a platen bearing arm, handles on the platen bearing arm, a foot treadle connected with the platen bearing arm to operate in unison therewith, and means actuated by the platen bearing arm for moving the type to printing position.

22. In a machine of the class described, the combination of a number of independent sets of type, a single set of keys controlling all of the sets of type, a platen bearing arm, handles on the platen bearing arm, a foot treadle connected with the platen bearing arm to operate in unison therewith, means actuated by the platen bearing arm for moving the type to printing position, and means for locking the type in printing position.

23. In a machine of the class described, the combination of a number of independent sets of type, a single set of keys controlling all of the sets of type, a platen bearing arm, handles on the platen bearing arm, a foot treadle connected with the platen bearing arm to operate in unison therewith means actuated by the platen bearing arm for moving the type to printing position, means for locking the type in printing position, and means for releasing the type.

24. In a machine of the class described, the combination of a number of independent sets of type, a single set of keys controlling all of the sets of type, a platen bearing arm, handles on the platen bearing arm, a foot treadle connected with the platen bearing arm to operate in unison therewith, means actuated by the platen bearing arm for moving the type to printing position, and an inking device moved to operative position when the platen approaches the type, and means for automatically returning it.

25. In a machine of the class described, the combination of a number of like groups of type, keys controlling the corresponding type of all of the groups, an independent platen for each group, and means actuated by either of said platens for moving all of the type simultaneously to printing position.

26. In a machine of the class described, the combination of a number of like groups of type keys controlling the corresponding type of all of the groups, an independent platen for each group, and means actuated by either of said platens for moving all of the type simultaneously to printing position, and spring actuated means for returning the type.

27. In a machine of the class described, the combination of type fixed in printing position, a projecting shield having an opening therein through which the type are exposed, and a head of a width corresponding to that of the shield, a platen carried by the head to coact with the type, and handles projecting from the sides of the head to stand on opposite sides of the shield, so arranged that an operator may grasp an article to be printed in both hands and also grasp the handles so that the article will be held against the platen and against the handles, and the handles will stand on opposite sides of the shield.

28. In a machine of the class described, the combination of a number of groups of type bearing the same symbols, but of different sizes, an independent platen movable to and from each group of type, a head having handles thereon for each platen, said handles shaped to enable an operator to grasp an article to be printed and also grasp the handles at the same time.

29. In a machine of the class described, the combination of a number of groups of type, an independent platen movable, to and from each group, and an independent inking pad for each group of type controlled by the corresponding platen and actuated by the platen to move to position to ink the group of type, and then withdraw during the movement of the platen toward the group of type.

30. In a machine of the class described, the combination of a number of groups of like type bearing plates, a number of sets of keys, each set controlling all of the like type bearing plates of each group, an independent printing platen for each group, means actuated by the movement of any of the platens for moving the type of all of the groups to printing position, spring actuated means for returning them, and an independent inking device for each group, operated by the movements of the corresponding platen, for the purposes stated.

31. The combination of a number of groups of type, a platen for each group independently movable to printing position and means for moving the type of each group to printing position by an operation of any one of the platens.

32. A number of groups of type, mechanism for simultaneously moving like type of each group to printing position, a platen for each group of type independently movable to printing position, said type moving mechanism actuated by any one of said platens.

33. A number of groups of type, mechanism for simultaneously moving like type of each group to printing position, a platen for each group of type independently movable to printing position, said type moving mechanism actuated by any one of said platens when said platen is moving to printing position.

34. In a machine of the class described, two groups of type, one group comprising two independently movable sets of type and the second group comprising two similar sets of type also arranged to be independently movable, means for simultaneously moving the type of both sets of both groups to position for printing the same characters arranged in the same way, a platen for each group so arranged that printing may be done from either group without printing from the other, and means for simultaneously releasing all of the sets of type.

35. In a machine of the class described, a number of groups of like type, each group comprising a set of type and also a second set of type to the right of the first, said sets being independently movable, the first set of type in each group being composed of similar type, said parts being so arranged that an impression taken from either group will contain the same characters arranged in the same manner, means for controlling the first set of type in all of the groups, means for controlling the second set of type in all of the groups, and a platen for each group by which independent impressions may be made from either group and means for simultaneously releasing all of the sets of type.

36. In a machine of the class described, two groups of type, one group comprising two independently movable sets of type and the second group comprising two similar sets of type, each set being independently movable, a set of keys for controlling the first set of type in each group and a set of keys for controlling the second set of type in both groups.

37. In a machine of the class described, a number of groups of like type, each group comprising a set of type and also a second set of type to the right of the first, said sets being independently movable, the first set in each group bearing similar type and the second set in each group bearing similar type, so arranged that an impression taken from either group will contain the same characters arranged in the same manner, a set of keys controlling both of the first sets of type in both groups and a second set of keys controlling both of the second sets of type in both groups.

38. The combination of type, a printing platen movable to and from the type and handles fixed to the printing platen shaped and disposed relative to the platen to enable an operator to grasp the handles and at the same time hold stock to printing position on the platen and in both hands.

39. The combination of type, a platen movable to and from the type and a handle fixed to the platen shaped to enable an operator to grasp stock with the same hand that engages the handle and hold said stock in printing position relative to the platen.

40. In a machine of the class described, a machine frame, a shield projecting from the machine frame, type mounted within the shield, a duplex handle movable to and from the type and a platen carried by the handle arranged to engage the type, the handle shaped to permit an operator to grasp both ends thereof in both hands and when the platen is moved to printing position to have the operator's hands on opposite sides of said shield.

41. In a machine of the class described, the combination of a machine frame, a shield projecting from the body of the machine frame and formed with an opening, type accessible through the opening in the shield, a platen movable to and from the type and handles on the platen to stand on opposite sides of the projecting shield.

42. In a machine of the class described, a number of groups of type a platen independently movable to and from each group, a head having handles thereon for each platen, said handles shaped to enable an operator to grasp an article to be printed and also to grasp the handles at the same time.

43. In a machine of the class described, a machine frame, a shield having an opening therein and projecting outwardly from the machine frame, type in the machine frame adjacent to the opening, a platen movable to and from the opening in the shield and a handle on one side of the platen substantially flush with the platen and arranged at one side of the shield whereby an operator may grasp a garment and hold it on the handle and over the platen and may press the handle and platen against the type of the machine while grasping the handle and garment.

44. In a machine of the class described, two rock shafts side by side, a type bearing plate fixed to each rock shaft, said plates arranged side by side with their printing faces flush at one point, an independent set of keys for each rock shaft and means for rocking the shafts for moving a given type to printing position by a depression of the key corresponding to said type.

45. In a machine of the class described, a complete group of relatively small type, a complete group of similar type of larger size, means for setting like types of each group to printing position by the same operation and a separate platen independently movable to and from each group.

46. The combination of a number of separate groups of type, each group comprising type of sizes different from the other groups, means for setting corresponding types of each group to printing position by the same operation and means for printing from the type of any one group to the exclusion of the others.

47. In a marking machine, the combination of type fixed in printing position, a lever capable of movement toward and from the type, a combined stock holding device and handle on said lever shaped to permit an operator to grasp an article to be marked and also the handle at the same time, and to thereby hold the article upon the stock holder in position to be printed upon, and means whereby a movement of the lever toward the type will effect a printing operation on the article held upon the stock holder.

CHESTER W. CANINE.

Witnesses:
J. RALPH ORWIG,
THOMAS G. ORWIG.